United States Patent [19] [11] Patent Number: 6,003,879
Grewal [45] Date of Patent: Dec. 21, 1999

[54] SEAL FOR STEEL FURNACE EMISSIONS

[75] Inventor: Sant P. S. Grewal, Fenwick, Canada

[73] Assignee: Stelco Inc., Ontario, Canada

[21] Appl. No.: 09/025,980

[22] Filed: Feb. 19, 1998

[51] Int. Cl.⁶ .................................................. F16J 15/06
[52] U.S. Cl. ........................... 277/609; 277/324; 277/630
[58] Field of Search ..................... 277/609, 324, 277/343, 628, 630; 373/72, 68, 77, 95; 110/173 R, 182.5, 271, 272; 266/266, 226, 270, 225, 265

[56] References Cited

U.S. PATENT DOCUMENTS

| | | | |
|---|---|---|---|
| 1,839,393 | 1/1932 | Inge | 137/461 |
| 3,152,703 | 10/1964 | Slacley, Jr. | 277/503 |
| 3,697,660 | 10/1972 | Frolov et al. | 13/17 |
| 3,709,506 | 1/1973 | Beerman | 277/503 |
| 3,939,910 | 2/1976 | Bruce | 166/84 |
| 4,189,457 | 2/1980 | Clement, Jr. | 264/30 |
| 4,253,644 | 3/1981 | Marshall et al. | |
| 4,295,001 | 10/1981 | Britton | 13/17 |
| 4,306,726 | 12/1981 | Lefebvre | 277/503 |
| 4,377,289 | 3/1983 | Lefebvre | 277/503 |
| 4,457,002 | 6/1984 | Mathgen et al. | 373/95 |
| 4,465,265 | 8/1984 | Kryczun et al. | |
| 4,759,032 | 7/1988 | Willis | 373/95 |
| 5,377,960 | 1/1995 | Leczo et al. | |
| 5,516,119 | 5/1996 | Trackwell et al. | 277/409 |
| 5,542,608 | 8/1996 | Kaylor | 239/400 |

FOREIGN PATENT DOCUMENTS

| | | |
|---|---|---|
| 2 308 321 | 9/1973 | Germany . |
| 24 39 776 | 3/1976 | Germany . |
| 1 400 224 | 7/1975 | United Kingdom . |

*Primary Examiner*—Anthony Knight
*Assistant Examiner*—Alison K. Pickard
*Attorney, Agent, or Firm*—Alston & Bird LLP

[57] ABSTRACT

A seal for a high temperature treatment vessel, particularly those common to the steel industry, has a primary purpose to prevent gases from escaping the treatment vessel. The seal is provided by a positive gas pressure curtain barrier means, a plurality of mechanical seal and a means of aspirating gases escaping past the seals for recycling into the vessel.

11 Claims, 6 Drawing Sheets

SEAL FOR STEEL FURNACE EMISSIONS

FIELD OF THE INVENTION

This invention relates to a seal structure which develops a gas curtain as a primary seal and mechanical seals downstream of the primary gas curtain, and more particularly, seals for use on basic oxygen furnace lances and electrodes for electric arc furnaces.

BACKGROUND OF THE INVENTION

During the operation of high temperature reaction vessels in the steel industry, material treatment devices are introduced through a neck in the vessel. As these devices deliver gaseous and/or solid materials to the vessel there are sudden bursts of high temperature gases. In order to contain fumes and maintain a desired atmosphere within the vessel, it is desirable to form a seal between the material treatment device and the vessel. This seal should optimally allow for movement of the material treatment device including its removal for maintenance while preventing volatile gases from escaping. Common methods of sealing a lance in a reaction vessel are often problematic because the seal is only effective when the axis of the sealing mechanism coincides precisely with the axis of the mouth of the vessel. U.S. Pat. No. 4,465,265 discloses an adjustably positioned lance structure which provides a gas-tight passage comprising a metal bellows and a protective sleeve which projects into the reactor. U.S. Pat. No. 5,377,960 describes an oxygen/carbon blowing lance assembly which includes a modular design housing for ease of maintenance but it is not disclosed how the lance is sealed in the vessel.

SUMMARY OF THE INVENTION

In accordance with an aspect of the invention, a seal for a closure of a high temperature treatment vessel common to the steel industry is provided. The vessel is connected to a suction line of sufficient capacity to remove operating gas volumes developed during materials treatment in the high temperature vessel. The closure is exposed to sudden bursts of high temperature gas volumes from high temperature materials treatment where such sudden bursts of gas volumes in the vessel develop sudden pressure rises at the closure by such sudden gas bursts exceeding suction line capacity. The seal comprises:

i) means for developing and continuously maintaining a positive pressure gas curtain inwardly of the closure;

ii) means for mechanically sealing the closure to resist gas flows which escape past the positive pressure gas curtain;

iii) means for defining a plenum outwardly of the mechanical seal and iv) the means for developing a positive pressure gas curtain comprising a plurality of aspirating nozzles, each nozzle developing a high velocity stream of gas from a source of pressurized curtain gas. The aspirating nozzles have aspirating intakes in communication with the plenum where the high velocity stream produces a low pressure at the intake to develop a relative negative pressure in the plenum and thereby capture in the plenum gases escaping past the mechanical seal and aspirating such gases through the intakes for return to the vessel. The seal may be particularly adapted for use on a lance of a basic oxygen furnace of ladle furnace, or on an electrode for an electric arc furnace.

In accordance with another aspect of the invention, a plug seal for a lance used in a basic oxygen furnace comprises:

i) a closure body portion for plug sealing a lance entry point opening in a furnace vessel;

ii) the closure body portion having a passageway through which a lance may extend;

iii) means is mounted on the closure body portion for developing and continuously maintaining a positive pressure gas curtain inwardly and beyond the body portion;

iv) means is provided in the passageway for forming a mechanical seal with lance exterior when extending through the passageway to resist gas flows which escape past the positive pressure gas curtain;

v) means is provided for defining a plenum outwardly of the mechanical seal means, the plenum means having a inlet communicating with the passageway outward of the mechanical seal; and vi) the means for developing a positive pressure gas curtain comprising a plurality of aspirating nozzles, each nozzle developing a high velocity stream of gas from a source of pressurized curtain gas. The aspirating nozzles have aspirating intakes in communication with the plenum where the high velocity stream produces a low pressure at the intake to develop a relative negative pressure in the plenum and thereby capture in the plenum gases escaping past the mechanical seal and aspirating such gases through the intakes for return to the vessel. The seal may be particularly adapted for use on a lance of a basic oxygen furnace of ladle furnace, or on an electrode for an electric arc furnace. The mechanical seal in the passageway comprises a plurality of baffle rings which are of a dimension to permit reciprocal movement of the lance through the passageway.

DESCRIPTION OF THE DRAWINGS

Several aspects of the invention are illustrated in the accompanying drawings, in which like numerals denote like parts throughout the several views, and in which.

DETAILED DESCRIPTION OF PREFERRED EMBODIMENTS

The invention relates generally to a seal for use in vessels which normally operate at high temperatures and which are common to the steel industry. The vessel may be a basic oxygen furnace, an electric arc furnace, a ladle furnace, coke ovens and the like. All of these vessels have in common very high temperature of operation, usually in excess of 500° C. for coke ovens and usually in excess of 2000° C. for various types of furnaces. The treatment of iron in these vessels can become explosive with large volumes of gases suddenly bursting forth within the vessel. The seal of this invention works particularly well with these types of vessels in preventing escape of gases due to the sudden burst of high volumes. In view of the several applications of the seal, it is understood that they can be used on a variety of configurations as will become apparent from the following discussion of the preferred embodiments of the seal such as on a basic oxygen furnace and on electric arc furnace.

Figure 1:
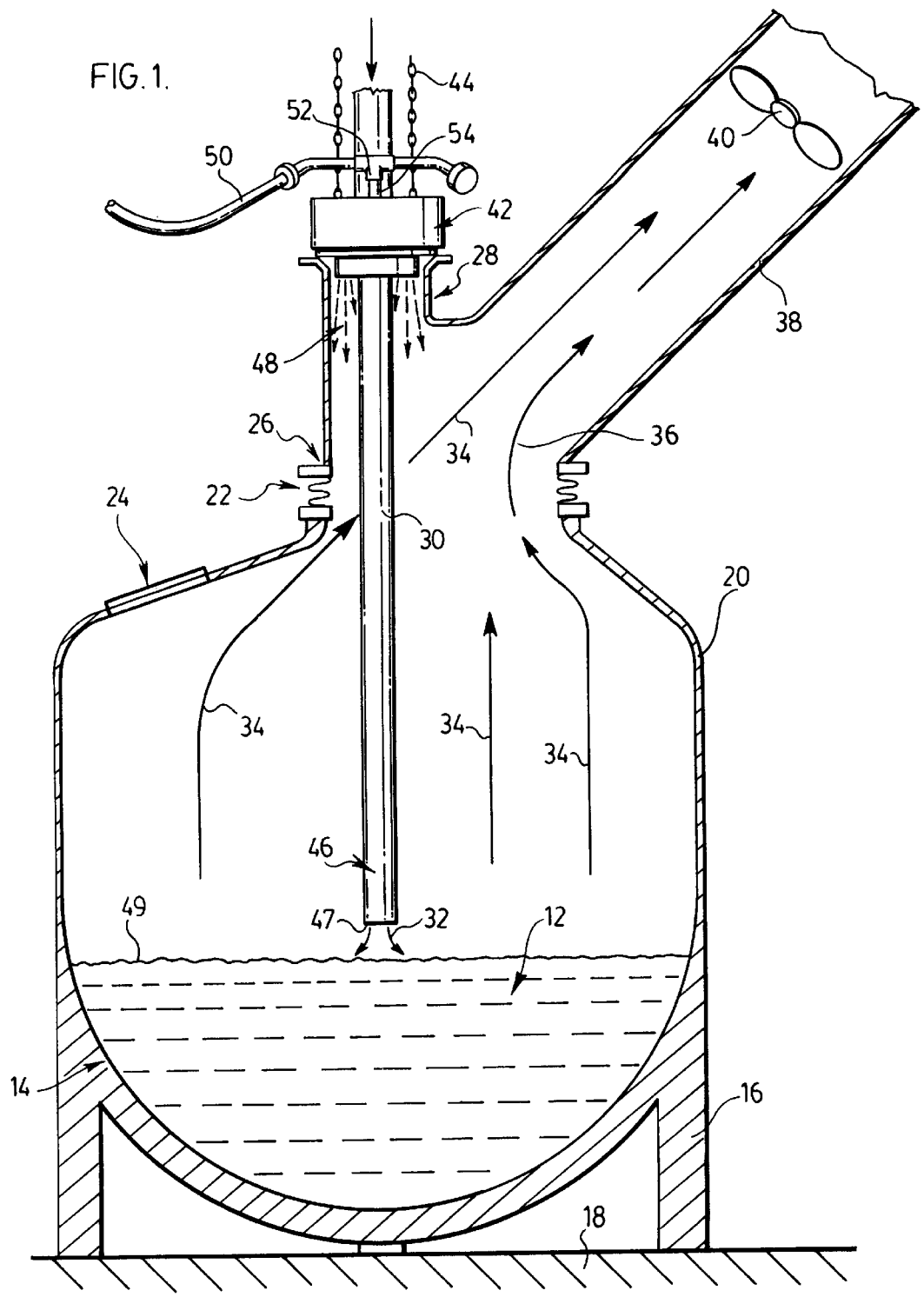
FIG. 1 is a schematic of a BOF (basic oxygen furnace) treatment vessel in operation with the lance plug seal in place.

With reference to FIG. 1, a basic oxygen furnace 10 is shown with molten metal 12 introduced to the base 14 of the vessel. The vessel may be trunion mounted in the usual manner or supported by standards 16 on a supporting structure 18. The vessel 10 has sidewalls 20 in which access door 24 is provided for introducing molten iron into the vessel and for introduction of other materials, such as alloying metals and scrap metal. Treatment material are also introduced through the neck 28 of the vessel 10. In one aspect a flexible retractable bellows collar 22 may be provided to allow adequate clearance to tilt the vessel 10. The vessel 10 includes a roof section 26 which includes a neck portion 28 to permit insertion and withdrawal of material treatment device 30. In accordance with this particular embodiment, the material treatment device 30 may be an oxygen lance for introducing oxygen in the direction of arrows 32 into the molten iron 12 for producing the desired steel chemistry. The reaction of the oxygen with the molten iron is exothermic and gives off considerable volumes of gases which flow upwardly as indicated by arrows 34. In the usual manner, the vessel 10 is provided with an evacuation port 36 which in turn is connected to an evacuation duct 38. In the usual manner, the duct is in communication with a high volume fan 40 for extracting the large volumes of gases rising in the vessel through the evacuation duct 38.

The lance 30 is normally raised and lower through the neck 28 of the vessel where, in accordance with this embodiment a plug seal 42 provides a seal for the lance within the neck 28. In accordance with standard practice, the plug seal allows the lance 30 to be inserted and withdrawn from the neck 28. In addition, the plug seal 42 is raised with the lance by virtue of retracting chains 44 to retract the plug seal with the lance without having to withdraw the lance from the plug seal. As is appreciated, the lance 30 can develop slag in the lower region 46 of the lance which would preclude its withdrawal through the opening within the plug seal 42. It is also understood that the lance 30 is raised and lowered relative to the plug seal when it is positioned in the neck 28. This permits movement of the oxygen nozzle 47 relative to the surface 49 of the molten metal. Such movement is, of course, in accordance with standard BOF operation to control the rate of reaction, control foaming of the slag and agitation of the molten iron. The plug seal 42 develops a primary seal in the neck 28 by forming a downwardly directed curtain of pressurized gases 48. In accordance with this particular embodiment, the gases for the gas curtain 48 are provided by way of a pressurized source of nitrogen gas in line 50 which is fed to a T-connector 52. The pressurized nitrogen is supplied to the seal through downwardly directed conduit 54. Further details of the structure of the plug seal will become apparent from the following discussion of FIG. 2.

Figure 2:
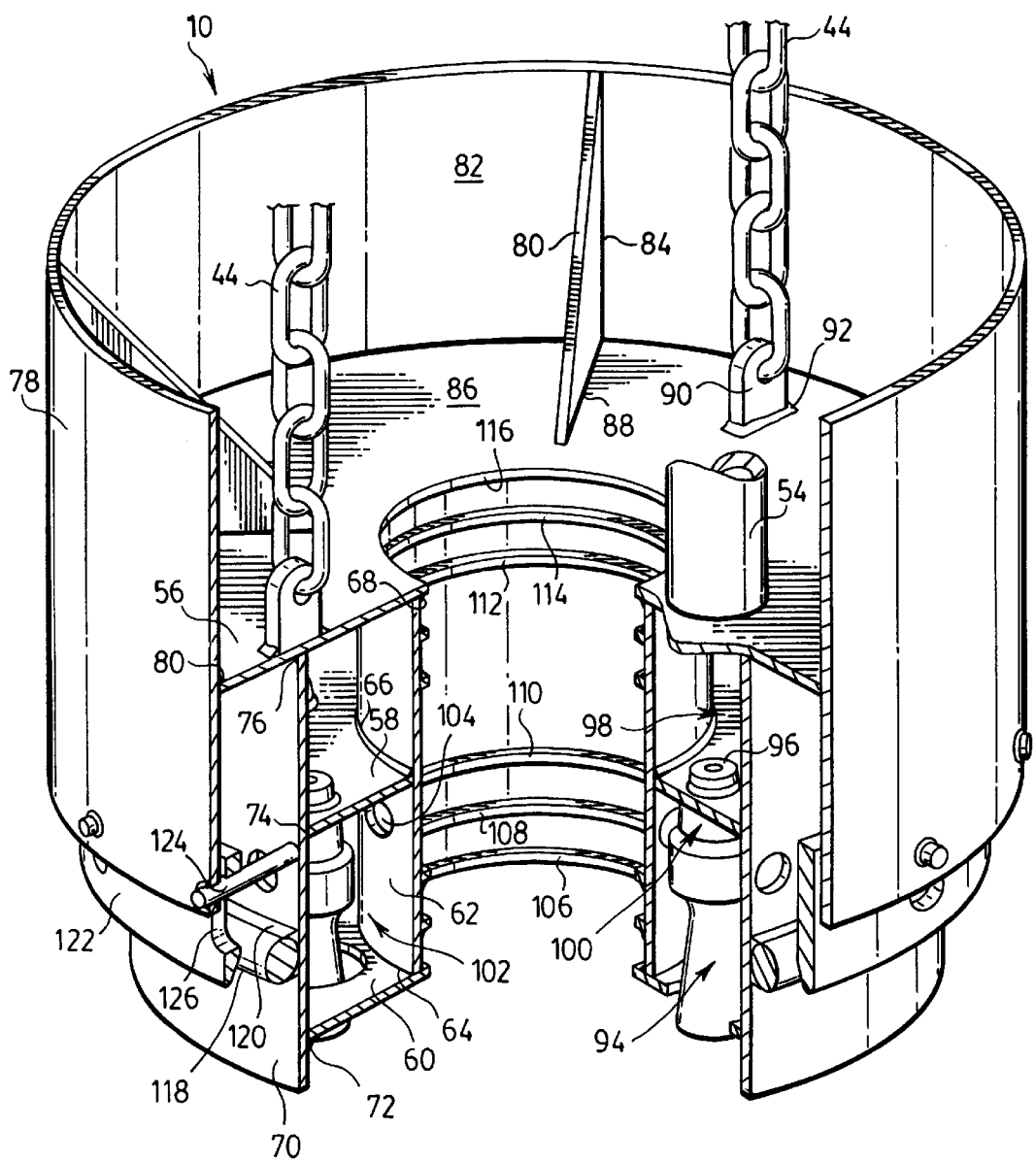
FIG. 2 is an elevational view, partly in section, of the plug seal.

Although it is understood that the features and advantages of the plug seal may be attained by various structures, an exemplary form of the structure is shown in FIG. 2 where a portion of the structure is removed to permit identification of the spatial relationship of the components. The plug seal 42 is generally circular so as to mate with the usual generally circular neck portion found on a basic oxygen furnace. It is appreciated, however, that the principles of this plug seal may be applied to other neck configurations where the plug seal itself would have a corresponding configuration.

The plug seal 42, in accordance with this embodiment, is constructed by welding together three concentric plates 56, 58 and 60 with an inside tubular member 62 welded at junctions 64, 66 and 68. An intermediate tubular member is shell 70 which is welded at junctures 72, 74 and 76. An outer shell 78 is welded to the upper plate 56 at juncture 80. To secure the shell to the upper plate 56, a plurality of triangular brackets 80 are welded to the inside face 82 of the shell 78 at juncture 84 as well on the top surface 86 of the upper plate 56 at juncture 88. The chains 44 are secured to the top plate 56 by eyes 90 which are welded at juncture 92. In accordance with this preferred embodiment, the welded interconnected structure forms a unitary body of substantial strength to facilitate its use in the steel making environment. At the same time, chambers are provided within the plug seal to facilitate implementation of the invention. In order to develop the downwardly directed gas curtain, a plurality of nozzles 94 are mounted in the intermediate plate 58. The nozzles have inlets 96 which are in communication with the annular chamber 98. Pressurized gas is supplied to annular chamber 98 through downwardly directed conduit 54. The pressurized gases pass through the inlets 96 of the nozzle to develop a jet stream. In accordance with this invention, the jet stream develops in the nozzle, a high velocity stream of gas which in turn develops a low pressure in region 100. In accordance with the invention, this relative low pressure region communicates with the chamber 102 to aspirate the space of the chamber. The chamber 102 is defined between the intermediate plate 58, the lower plate 60 and the inner and intermediate shells 62 and 70. As will be described later, inlets 104 are provided in the shell wall 62 for purposes of aspirating escaping gases and returning them to the furnace.

In accordance with this particular embodiment, the plug seal has three types of mechanical seals. The primary mechanical seal about the lance is provided by way of spaced-apart baffles 106, 108 and 110. To further resist upward flow of escaping gases above baffle 110, further baffles 112, 114 and 116 are provided, the purpose of which will be described in more detail in FIG. 5. The secondary seal is provided on the outside of shell 70. An annular ring 118 is welded to the shell at 120. The secondary ring seal 118 engages the neck to form an outer seal. A tertiary seal is provided by a floating collar 122 which is mounted in a manner to permit it to float relative to the roof of the vessel. Such mounting is achieved by pins 124 extending between outer shell 78 and intermediate shell 70 where the collar has vertically extending slots 126, the function of which will be described in more detail with respect to FIG. 4.

Figure 3:
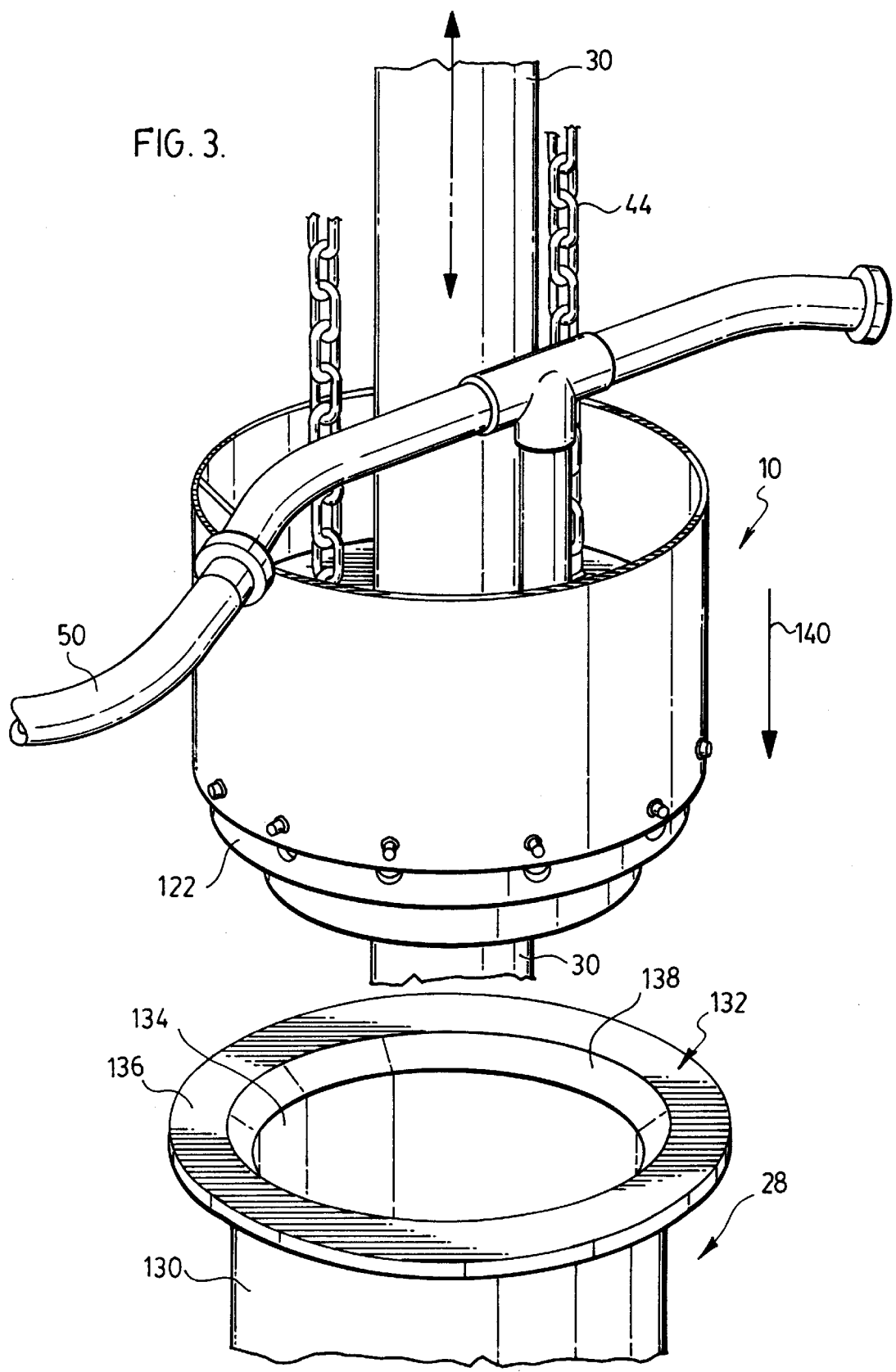
FIG. 3 is an elevational view of the plug seal with the lance being applied to the vessel neck.

FIG. 3 is an enlarged view of the neck 28 of the vessel 10. The neck 28 includes sidewall 130 with an outwardly extending rim 132. The transition from the interior 134 of the sidewall 130 to the upper surface 136 of the rim is provided by a sloped surface 138 which is frusto conical in shape. The frusto conical surface provides a nesting surface for the fixed ring secondary seal 118 to rest on as the plug seal 42 is lowered onto the neck 28. The lowering of the plug seal 42 onto the neck 28 is achieved by lowering the chains 44 with the lance 30 aligned within the plug seal 42. It is understood that the supply line 50 for the nitrogen is a flexible hose to accommodate the upward and downward movement of the plug seal 42. As the plug seal is being lowered, the tertiary seal in the form of the collar 122 is lowermost with the upper portion of a slot 126 resting on the respective rod 124 which is shown in more detail in FIG. 2.

As the plug seal 42 is lower in the direction of arrow 140, the floating collar 122 rests on the upper surface 136 and floats relative to the plug seal 42 while the ring seal 118 nestles onto the transition region 138 of the neck 28.

Figure 4:
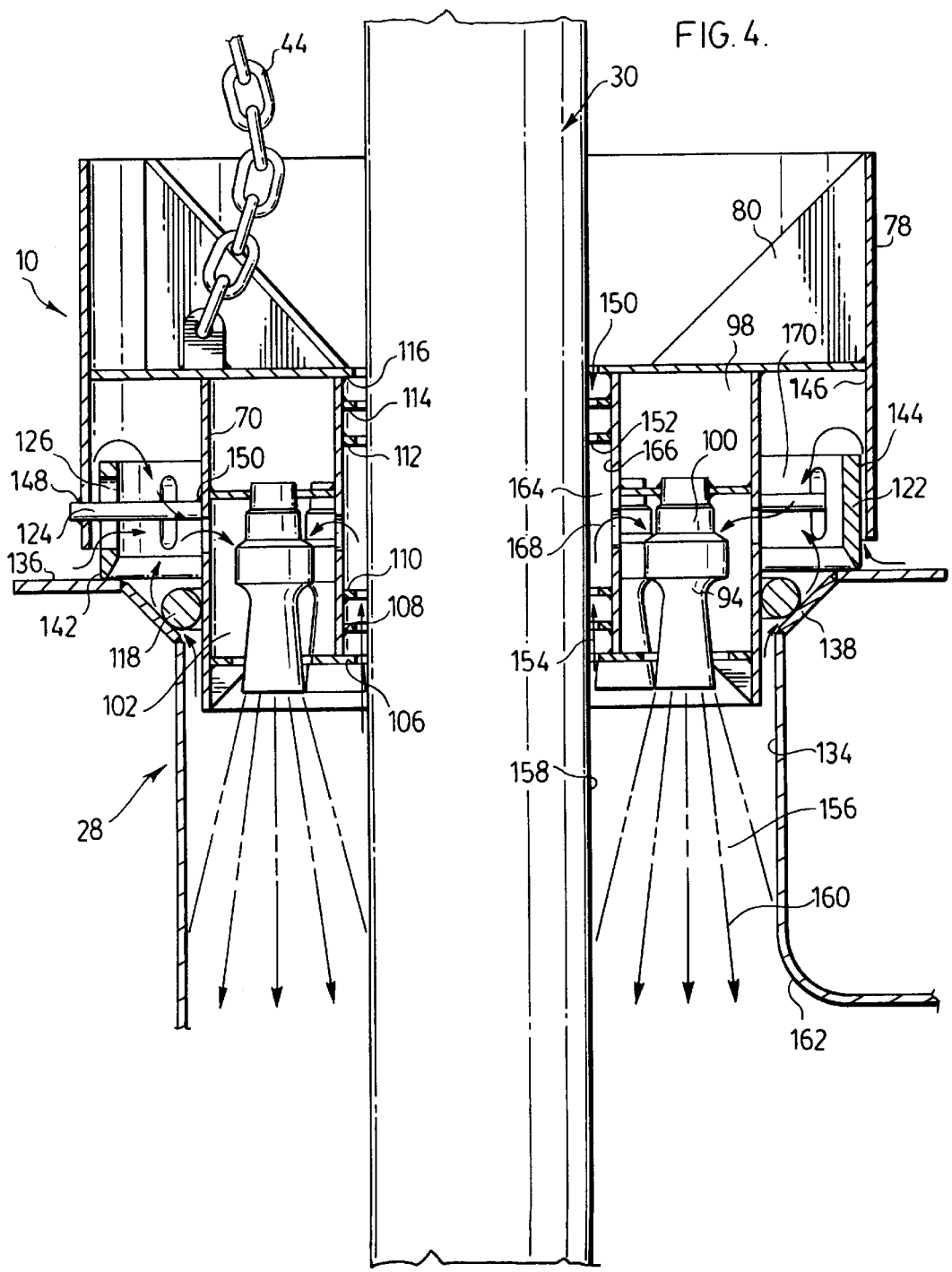
FIG. 4 is a cross-sectional view illustrating the flow of gases within and around the plug seal.

With reference to FIG. 4, the plug seal 42 has been lower onto the neck 28 until the ring seal 118 is nestled on the transition portion 138. This seats the plug seal 42 in the neck 28. The floating collar 122 floats downwardly onto the neck upper surface 136. The collar has a depending tapered edge 142 which rests on the upper surface 136. Regardless of whatever degree of canting there might be in locating the plug seal 42 in the neck 28, the floating collar with tapered edge 142 will rest on the upper surface 136 of the rim. This floating aspect of the collar is achieved, as already described, by virtue of the collar having longitudinal vertically extending slots 126 through which fixed rods 124 extend. In this particular embodiment, in order to accommodate floating of the collar 122, the exterior surface 144 of the collar has an outside dimension slightly less than the inside dimension of the interior surface 146 of the outer shell 78. This allows the collar to float upwardly and downwardly in a telescopic manner within the outer shell 78. The rods 124 are as shown in FIG. 4 welded to the outer shell 78 at weld 148 and to the intermediate shell 70 at weld juncture 150. The seating of the plug seal within the neck 28, as the plug seal rests on ring 118, is indicated by the chain 44 having slack therein.

The lance 30 extends through the central opening 150 which is defined by the circular interior surface 152 of each baffle 106, 108, 110, 112, 114 and 116. The interior surface 152 has an interior dimension which is slightly larger than the exterior dimension of the lance 30. This permits the lance to move up and down within the plug seal after the plug seal is seated on the neck 28. The spacing, however, permits gases to escape upwardly along the exterior of the lance surface as shown by arrows 154. The nozzles 94 direct the pressurized nitrogen within chamber 98 downwardly of the annular space 156 defined between the interior surface 134 of the neck 28 and the exterior surface 158 of the lance. The downwardly directed streams 160 of nitrogen develop at the lower opening 162 of the neck 28, a pressurized curtain of gas to resist upward flows of vessel gases to within the space 156. As is appreciated by those skilled in the art, the upward flows of gases into regions 156 are usually due to the sudden burst of volumes of gases which result from the treatment activities taking place in the vessel. The gases are primarily withdrawn from the upper portion of the vessel by the evacuation duct 38. However, the momentum of the gases can carry them upwardly towards the gas curtain at neck 28 and thereby developing sudden pressure rises at the gas curtain seal. This primary seal can be penetrated by the upward flow of gases if they have sufficient momentum and move through the gas curtain towards the mechanical seal provided by the baffles 106, 108 and 110. In terms of direction of gas flow, a plenum 164 is defined outwardly of baffle 110, which receives the escaping gases flowing between the outer surface 158 of the lance and the inner surface 152 of the baffles 106, 108 and 110. The plenum 164 is defined by the interior surface 166 of the inner shell 62, the upper and lower baffles 110 and 112 and the exterior surface 158 of the lance. The baffles 112, 114 and 116 are provided to develop back pressure in the plenum 64 should there be a sudden burst of escaping gases past baffles 106, 108 and 110. In accordance with this invention, the nozzles 94 are aspirating nozzles which are designed to draw escaping gases from the plenum 164 to within the space 102 which houses the aspirating intakes 100 of the nozzles 94.

Such aspiration of the gases from plenum 164 is indicated by arrow 168. Similarly, the aspirating nozzles also draw gases in from the annular space 170 defined within the collar 122 and which have escaped past the ring seal 118.

Figure 5:
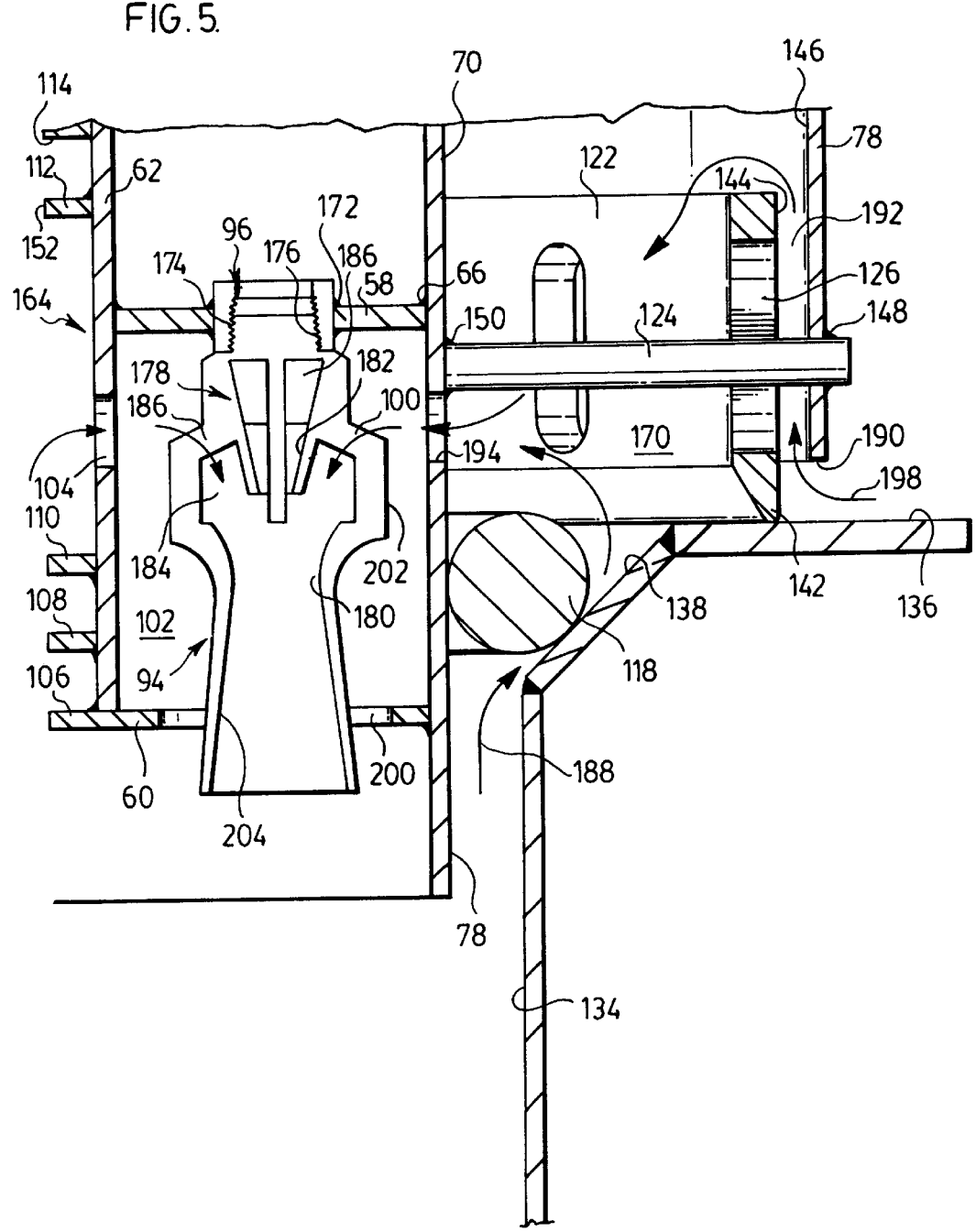
FIG. 5 is an enlarged cross-sectional view through one side of the seal plug.

The manner in which such gases are aspirated and captured is defined in more detail in respect of FIG. 5 where each aspirating nozzle 94 has an intake 96 which is welded at 172 to the plate 58. The inlet 96 may be a bushing with a threaded interior portion 174 which receives the threaded stem 176 of the nozzle 94. The nozzle 94 has a caged support 178 which connects the threaded stem 176 to the nozzle throat 180 and in turn defines the intake 100. The nozzle has a jet portion 182 which serves to develop a jet stream in the throat 180 and hence develop a vacuum in region 184. The caged mounting of the jet portion 182 within the nozzle 94 provides intake openings 186 in the nozzle which thereby perform the aspirating function. As already discussed with respect to FIG. 4, a plenum 164 is defined between the baffles 110 and 112. Correspondingly, a space 170 is developed within the floating collar 122. Gases which penetrate the curtain seal can also flow around the exterior of the outer shell 78 and the interior of the neck at 134 towards the ring seal 118. The gases raising through this space flow upwardly in the direction of arrow 188 and depending upon the degree of roundness of the ring 118, debris on the sloped surface 138, the canting of the structure as it nestles within the neck and other variables, vessel gases may escape past the ring 118 to within the space 170. The outer shell 78 has its lower portion 190 spaced from the upper surface 136 of the neck by virtue of the collar 122 being spaced inwardly of the shell 78. A narrow annular space 192 is defined between the outer surface 144 of the collar and the inner surface 146 of the shell 78. The aspirating nozzles 94 develop within the chamber 102 a relative negative pressure. The chamber 102 communicates with the plenum 164 through a plurality of apertures 104. The chamber 102 also communicates with space 170 through a plurality of apertures 194. The aspirating nozzles thereby ensure that escaping gases collecting in the plenum 164 are captured and drawn into chamber 102 and recirculated into the vessel with the jet stream of curtain gas by virtue of the captured gases flowing through the intake 100 of the aspirating nozzles. Similarly, gases which escape past the ring 118 into the space 170 are drawn into chamber 102 and recycled through the aspirating intakes via the openings 194. The narrow space 192 between the collar and the outer shell allow ambient air to be drawn into the space 170 as indicated by arrows 198. This drawing in of the ambient gases provides a sweeping action of the space 170 to ensure that all gases which escape past the ring 118 are draw into the chamber 102 for recirculating back into the vessel.

To facilitate installation of the nozzles within the plug seal 10, the lower plate 60 has a plurality of apertures 200 formed therein. The size of each aperture is sufficient to clear the exterior of the body portion 202 of the nozzle and allow threading of the stem 176 into the bushing 174. Also as shown in section, the nozzle beyond the throat section 180 has a diverging section 204 which develops an outwardly directed cone of pressurized gases. The spacing of the nozzles are such that the cones overlap and thereby develop a continuous gas curtain around the lance at the lower portion of the neck in the space generally indicated by neck opening 162 which includes the space 156.

Figure 6:
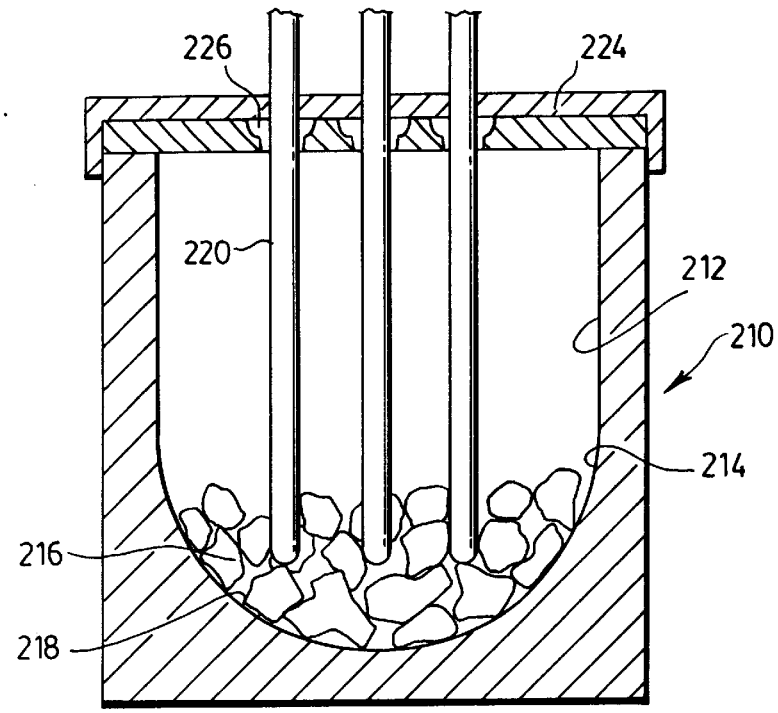
FIG. 6 is a schematic view of an electric arc furnace.

An alternative application of the seal technology may be, for example, in sealing the space about electrodes used in electric arc furnace. As shown in FIG. 6, an electric arc furnace 210 is schematically shown with an inner vessel 212 having the usual water cooling on the vessel wall 214. Scrap metal and the like may be provided at 216 in the lower region 218 of the vessel. The electrodes 220 extend through the removable lid 224 for the furnace. Each electrode 220 includes a separate arc seal 226 to seal the space around the electrode which moves relative to the arc seal during operation of the furnace.

Figure 7:
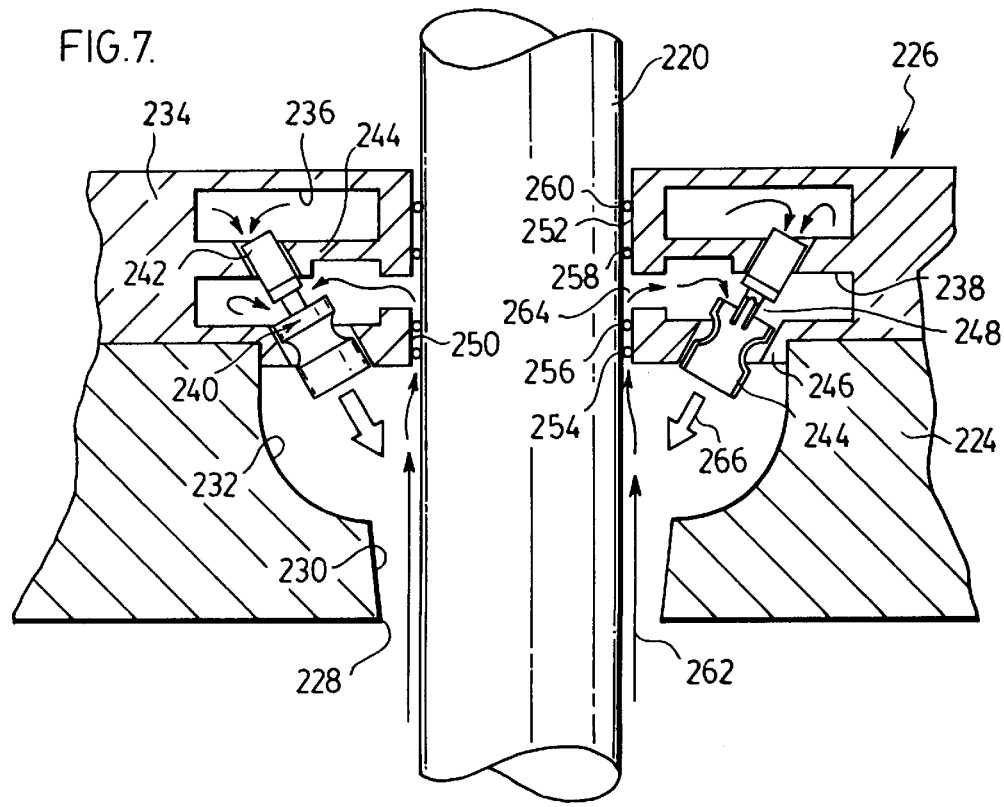
FIG. 7 is a section through an electrode seal for an electrode of FIG. 6.

As shown in more detail in FIG. 7, the electrode 220 extends through the electrode arc seal 226. In this embodiment, the lid 224 has an opening 228 defined therein to receive the electrode 220. Above the opening 228 is the sloped inner wall 230 of the lid 224 with a rounded out cavity portion 232 to accommodate the development of a pressurized curtain of gases flowing out through opening 228. The seal 226 is preferably made of ceramic material and comprises a body portion 234 which includes hollowed out cavities 236 and 238. The nozzles generally designated 240 are installed in the body portion with the inlet 242 installed in the divider 244 which partially defines the cavity 236. The nozzle divergent portion 244 is mounted within the lower wall 246 of the body portion. The aspirating inlets for the nozzles are provided at 248 and are in communication with the cavity 238. The interior surfaces 250 and 252 of the body portion include baffle rings 254 which may be similar to and function in the same manner as the baffles 106, 108, 110, 112, 114 and 116 of the plug seal of FIG. 2. The number of baffles may be less and in accordance with this particular embodiment, the lower wall 246 includes baffles 254 and 256. The upper portion 252 includes baffles 258 and 260. Gases from within the electric furnace which pass upwardly through the gas curtain in the direction of arrow 262 may have sufficient momentum to pass baffles 254 and 256 and be gathered in the plenum region 264. However, by virtue of the aspirating intake 248 being in communication with the cavity 238, the escaping gases, which pass by the baffles 254 and 256, are drawn into the cavity 238 for recirculating back into the vessel in the direction of the gas stream 266 for developing the gas curtain.

The electrode seal functions in a manner similar to that described with respect to plug seal. The electrode seal accommodates reciprocal movement of the electrode through the seal. As is appreciated with arc furnaces, the electrodes 220 are withdrawn entirely from the lid before the lid is removed from the furnace. This is unlike the plug seal; however, in view of the electrodes not being coated with slag, they may be withdrawn cleanly from the respective plugs 226 which may be permanently mounted within the lid 224. The spacing between the interior of the baffles 254, 256, 258 and 260 is such to accommodate the movement of the electrode. It is appreciated that the device for carrying the electrodes is capable of precisely moving the electrodes into and out of the seals without harming the electrode surface.

It is apparent from this detailed description of various embodiments of the invention that a seal is now provided for use on vessels which have sudden bursts of high volumes of gas at high temperatures to control the release of such gases from the vessel. The escaping gases are captured by the aspirating intake of the nozzles which are used to develop the gas curtain and thereby minimize leakage of the gases beyond the seal. The seal can accommodate sudden changes in pressure because of the dampening effect of the nitrogen curtain as well as the dampening effect of the baffle seals and the like. The nozzles are operating continuously so that a relative low pressure is always maintained to ensure that any gases which escape past the seals are captured and recycled back into the furnace. The seals are readily constructed of materials which resist high temperatures; for example, the seal in an electric arc furnace is capable of operating at temperatures well in excess of 2000° C. The manner in which they function facilitates their manufacture so that they are cost effective in use. By virtue of the manner in which the seal may be constructed, there is great flexibility in the shape and design of the seal to accommodate various vessel designs used in the steel making industry around the world.

Although preferred embodiments of the invention have been described herein in detail, it will be understood by those skilled in the art that variations may be made thereto without departing from the spirit of the invention or scope of the appended claims.

I claim:

1. In a high temperature treatment vessel common to the steel industry, a seal for a closure for a vessel opening, said vessel being connected to a suction line of sufficient capacity to remove operating gas volumes developed during materials treatment in said high temperature vessel, said closure for said vessel opening being exposed to sudden bursts of high temperature gas volumes from high temperature materials treatment, such sudden bursts of gas volumes in said vessel developing sudden pressure rises at said closure for said vessel opening by such sudden gas bursts exceeding suction line capacity, said seal comprising:

i) means for developing and continuously maintaining a positive pressure gas curtain inwardly of said closure;

ii) means for mechanically sealing said closure to resist gas flows which escape past said positive pressure gas curtain;

iii) means for defining a plenum outwardly of said mechanical seal means;

iv) said means for developing a positive pressure gas curtain comprising a plurality of aspirating nozzles, each nozzle developing a high velocity stream of gas from a source of pressurized curtain gas, said aspirating nozzles having aspirating intakes in communication with said plenum where the high velocity stream produces a low pressure at said intake to develop a relative negative pressure in said plenum and thereby capture in said plenum gases escaping past said mechanical seal and aspirating such gases through said intakes for return to said vessel.

2. In a high temperature treatment vessel of claim 1, said closure having an opening through which a material treatment device is directed, said mechanical seal being provided about said material treatment device, said plenum by virtue of said relative negative pressure capturing gases escaping past said mechanical seal and flowing toward said plenum.

3. In a high temperature treatment vessel of claim 1, said mechanical seal sealing said closure at an opening in said vessel, said plenum capturing gases escaping past said mechanical seal as such gases flow into said low pressure plenum.

4. In a high temperature treatment vessel of claim 2 said opening in said closure, receives a lance for introducing treatment gases and/or solids to a basic oxygen furnace or a ladle furnace.

5. In a high temperature treatment vessel of claim 2 said opening in said closure receives an electrode for an electric arc furnace.

6. In a high temperature treatment vessel of claim 3 said closure being adapted to seal said vessel opening in a vessel carrying coke oven gases.

7. A plug seal for a lance used in a basic oxygen furnace, said plug seal comprising:

i) a closure body portion for plug sealing a lance entry point opening in a furnace vessel;

ii) said closure body portion having a passageway through which a lance may extend;

iii) means mounted on said closure body portion for developing and continuously maintaining a positive pressure gas curtain inwardly and beyond said body portion;

iv) means in said passageway for forming a mechanical seal with lance exterior when extending through said passageway to resist gas flows which escape past said positive pressure gas curtain;

v) means for defining a plenum outwardly of said mechanical seal means, said plenum means having an inlet communicating with said passageway outward of said mechanical seal;

vi) said means for developing a positive pressure gas curtain comprising a plurality of aspirating nozzles, each nozzle developing a high velocity stream of gas from a source of pressurized curtain gas, said aspirating nozzles having aspirating intakes in communication with said plenum where the high velocity stream produces a low pressure at said intakes to develop a relative negative pressure in said plenum and thereby capture in said plenum gases escaping past said mechanical seal and aspirating such gases through said intakes for return to said vessel.

8. A plug seal of claim 7 wherein said mechanical seal is a plurality of baffle rings, the interior diameter of said rings being greater than an exterior diameter of a lance extending through said passageway to permit thereby reciprocal movement of said lance through said passageway.

9. A plug seal of claim 7 wherein a second means for forming a mechanical seal between said plug seal and a lance entry point opening in a furnace vessel, said plenum having a second inlet outward of said second mechanical seal to capture at said second inlet to said plenum, gases escaping past said second mechanical seal.

10. A plug seal of claim 9 wherein a gas collection space is provided above said second mechanical seal and which communicates with said second inlet to said plenum, a baffle defining an ambient air inlet to said collection space to control ambient flow into said collection space.

11. A plug seal of claim 7 wherein a chamber supplies pressurized gases to each inlet of each of said aspirating nozzle which develops a high velocity stream of gas.

* * * * *